US009068580B2

(12) United States Patent
Haaser

(10) Patent No.: US 9,068,580 B2
(45) Date of Patent: Jun. 30, 2015

(54) BREATHER OF A HYDRAULIC OR ELECTROHYDRAULIC CONTROL DEVICE

(71) Applicant: ZF Friedrichshafen AG, Friedrichshafen (DE)

(72) Inventor: Norbert Haaser, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 135 days.

(21) Appl. No.: 13/947,178

(22) Filed: Jul. 22, 2013

(65) Prior Publication Data

US 2014/0041733 A1 Feb. 13, 2014

(30) Foreign Application Priority Data

Aug. 13, 2012 (DE) ......................... 10 2012 214 388

(51) Int. Cl.
*F15B 21/04* (2006.01)
*B01D 19/00* (2006.01)

(52) U.S. Cl.
CPC ......... *F15B 21/044* (2013.01); *Y10T 137/3087* (2015.04)

(58) Field of Classification Search
CPC .. B01D 19/0031; B01D 53/22; B01D 53/228; B01D 71/36; F15B 21/04; F15B 21/044
USPC ..................................................... 96/6; 95/46
See application file for complete search history.

(56) References Cited

U.S. PATENT DOCUMENTS

| | | | | |
|---|---|---|---|---|
| 4,385,909 A * | 5/1983 | Starr | 95/266 |
| 4,529,419 A * | 7/1985 | Perl et al. | 96/6 |
| 5,215,312 A * | 6/1993 | Knappe et al. | 277/312 |
| 5,326,386 A * | 7/1994 | Lee et al. | 96/6 |
| 5,348,570 A * | 9/1994 | Ruppert et al. | 96/6 |
| 5,914,415 A * | 6/1999 | Tago | 96/14 |
| 6,402,810 B1 | 6/2002 | Mayer et al. | |

(Continued)

FOREIGN PATENT DOCUMENTS

| | | |
|---|---|---|
| DE | 42 10 979 A1 | 10/1993 |
| DE | 197 17 043 A1 | 6/1998 |

(Continued)

OTHER PUBLICATIONS

German Search Report Corresponding to 10 2012 214 388.2 mailed Oct. 25, 2012.

*Primary Examiner* — Jason M Greene
(74) *Attorney, Agent, or Firm* — Davis & Bujold, P.L.L.C.; Michael J. Bujold

(57) ABSTRACT

A venting device for a hydraulic control unit, designed as a diaphragm in a bore in the control unit, so that collected air can escape, via the diaphragm, to outside the housing. A membrane, which is permeable to air and oil when under pressure, closes the diaphragm bore with respect to the outside. The housing bore and the diaphragm form an inside space that can be vented, via the membrane. The inside space being delimited, during operation, by the diaphragm and an oil column which passes from the control unit into the housing bore and is continually maintained at a defined pressure at which oil, in the housing bore, either does not pass through the membrane or only a minute amount passes therethrough. The oil column remains in the housing bore so that only air, contained in the oil, is vented to the outside without any air being drawn into the control unit from outside.

17 Claims, 1 Drawing Sheet

(56) References Cited

U.S. PATENT DOCUMENTS

| | | | | |
|---|---|---|---|---|
| 6,743,088 | B2 * | 6/2004 | Closkey | 96/6 |
| 7,166,024 | B2 * | 1/2007 | Mashiko et al. | 96/6 |
| 2009/0049988 | A1 * | 2/2009 | Meindl | 95/285 |
| 2010/0024898 | A1 * | 2/2010 | Bansal et al. | 96/6 |
| 2010/0132545 | A1 * | 6/2010 | Hummelt | 95/46 |
| 2011/0049399 | A1 * | 3/2011 | Thomas et al. | 251/12 |

FOREIGN PATENT DOCUMENTS

| | | | |
|---|---|---|---|
| DE | 199 33 620 | A1 | 1/2001 |
| DE | 20 2004 001 139 | U1 | 5/2004 |
| DE | 20 2006 020 018 | U1 | 9/2007 |
| DE | 10 2006 030 853 | A1 | 1/2008 |
| DE | 10 2007 050 921 | A1 | 5/2009 |

* cited by examiner

BREATHER OF A HYDRAULIC OR ELECTROHYDRAULIC CONTROL DEVICE

This application claims priority from German patent application serial no. 10 2012 214 388.2 filed Aug. 13, 2012.

FIELD OF THE INVENTION

The invention concerns a venting device for a hydraulic or electro-hydraulic control unit.

BACKGROUND OF THE INVENTION

As is known, air entrapped in a hydraulic system generally has an adverse effect on the control and regulating behavior of the hydraulic system. This air can on the one hand be so-termed primary air, which enters the hydraulic system during the assembly of its components and which, in the ready-assembled unit, undesirably remains trapped at some point or another. On the other hand, air can also make its way into the hydraulic system at a later time, during the operation of the ready-assembled unit.

From DE 19717043 C2 it is known that water present in the hydraulic fluid of a hydraulic unit and gases dissolved in the hydraulic fluid of a hydraulic unit can be separated off by pervaporation methods. In this case the gas or water evaporates at an oil-permeable membrane fitted at a suitable point in the hydraulic system.

DE 19933620A1 describes an oil filter in which is incorporated a semi-permeable membrane for separating off air fractions present in the oil. A semi-permeable membrane of this type is also suitable for venting other dead spaces in which air can or does collect.

DE 4210979 C2 describes a water-tight housing for an electric control unit, which is vented by a semi-permeable wall integrated in a plug. For this a spark-plug is used, whose electric contacts are cast and soldered to a plate inside the housing, whereby the plug together with the housing form a unit which is sealed relative to the outside.

A further possibility known from practice for venting valve-housing components of a hydraulic system immersed in oil is to use venting diaphragms—for example fitted with a sieve-screen insert—at suitable points in the control unit, for example in an outlet duct of a hydraulic valve. Although such a device reliably vents the hydraulic space concerned, this takes place at the cost of a continual oil leak which has to be allowed for in the design of the oil supply to the control unit and generally leads to some undesired loss of performance in the system. Besides, in some operating situations it can happen that air from the outside is drawn back into the hydraulic control unit by way of the venting diaphragm.

SUMMARY OF THE INVENTION

The purpose of the present invention is to provide a venting device for a hydraulic or electro-hydraulic control unit by means of which a space in the control unit that contains oil can be reliably vented to the outside without significant oil leakage and without air from the outside being able to make its way back into the space in the control unit to be vented.

According to the invention, this objective is achieved with a venting device having the advantageous design features of the invention.

According to these a venting device of a hydraulic or electro-hydraulic control unit is proposed, which is configured in the form of a diaphragm inset into a housing bore of a housing of the control unit so that air collected in the control unit can escape to the space outside the housing by way of the diaphragm bore. According to the invention, it is provided that in the diaphragm is inset a membrane that, when under pressure, is permeable to air and to oil and which closes off the diaphragm bore relative to the outside so that the housing bore and diaphragm form an inside space which can be vented to the outside by way of the membrane, the space being permanently bounded during operation, on its side opposite the diaphragm, by an oil column passed by the control unit into the housing bore and maintained by the control unit continually under a defined pressure, the pressure being such that the oil present in the housing bore does not pass through the membrane, or does so only in very small amounts, whereas an oil column remains permanently in the housing bore so that at least to a large extent only the air fraction present in the oil is vented to the outside while no air can be drawn back from the outside into the control unit.

In a further development of the invention it is proposed to provide additional design means in the hydraulic or electro-hydraulic control unit, in the area of the oil feed to the housing bore, which prevent the oil column from draining out of the housing bore when the control unit is not operating. This can ensure that at no time can air from outside be drawn into the hydraulic system of the control unit via the venting device.

BRIEF DESCRIPTION OF THE DRAWINGS

Below, the invention is explained in more detail with reference to the figures, which show.

DETAILED DESCRIPTION OF THE PREFERRED EMBODIMENTS

Figure 1:
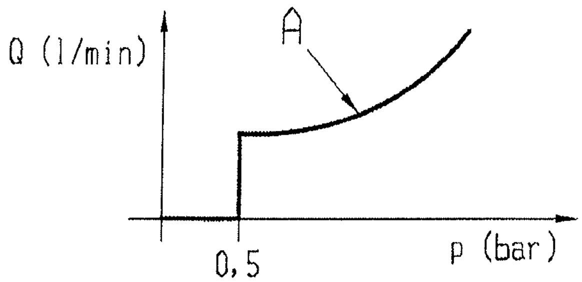
Fig. 1 (PRIOR ART)
FIG. 1: A typical venting curve of a known PTFE membrane.

The invention is based on the recognition that PTFE (polytetrafluoroethylene) membranes known from the prior art conform to a mathematical venting curve. FIG. 1 shows a typical venting curve A, with an oil pressure p that acts on the PTFE membrane plotted along the abscissa and a volume flow Q passing through the PTFE membrane plotted along the ordinate of the coordinate system. It can be seen clearly that a PTFE membrane acted upon by pressure is at least largely impermeable to both air and oil until a discrete pressure threshold—in the material example shown, approximately 0.5 bar—has been reached, and only above that pressure threshold can air pass through the membrane in larger amounts.

Now, if in accordance with the invention such a membrane is used to close off a space or a housing bore of the housing of a hydraulic or electro-hydraulic control unit, which space can be filled with oil from the control unit, then up to the discrete pressure threshold typical for the membrane used neither oil nor air can emerge out of the space or housing bore and escape to the outside. Air dissolved in the oil will collect in front of the membrane and will only pass through the membrane if the pressure applied by the hydraulic control unit to the oil column present in the space or housing bore to be vented exceeds the threshold. This ensures the desired venting function.

Owing to the inherent oil-repellent nature of the smoothed PTFE, its small pore size and its smooth surface, the fabric of the PTFE membrane is able to hold back oil and to a large extent allow only air to escape, provided that the membrane is not acted upon by too high an oil pressure and that the smooth side of the membrane is facing toward the oil. Thus, by using such a smoothed PTFE fabric the oil can be held back to a large extent or even entirely without preventing the escape of troublesome air out of the space or housing bore to be vented. In a particularly advantageous manner, the oil column remaining in the space or housing bore to be vented reliably prevents air from the outside from being drawn into the control unit. If the pressure falls again to a value lower than the discrete pressure threshold, then only the height of the oil column changes, without air being drawn into the pressure system of the hydraulic control unit.

Moreover, the fabric of the usual PTFE membranes is resistant to pressure and temperature, so the membrane has a certain mechanical robustness, allowing it for example to be used in a hydraulic or electro-hydraulic control unit.

Suitable materials for the membrane of the venting device according to the invention are mentioned for example in paragraph [0033] of DE 19717043 C2. It is advantageous to use a smoothed PTFE (polytetrafluoroethylene) fabric with a pore size category such that, for example, its air permeability is around 7 $l/m^2/sec$, for example one with a pore size of 12 μm.

Figure 2:
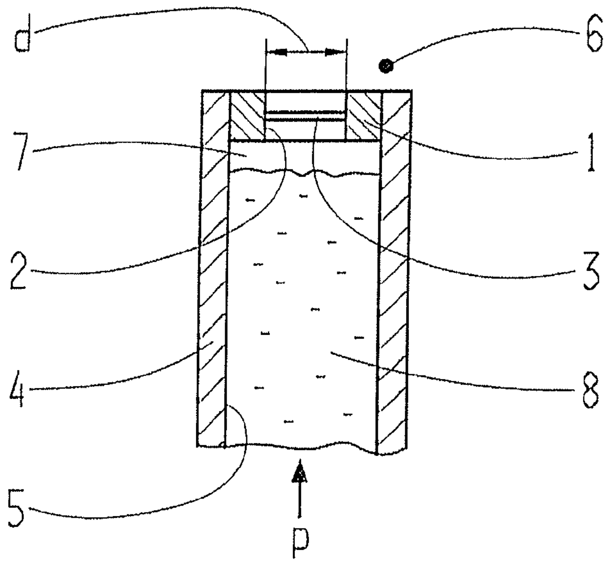
FIG. 2: An example embodiment of a venting device according to the invention.

FIG. 2 shows a simplified representation of an example embodiment of the invention. Indexed as 4 is a housing of a hydraulic or electro-hydraulic control unit (not shown in any greater detail). The housing 4 has a housing bore 5 which is open to a space 6 outside the housing 4. Into this housing bore 5 is inset a venting device in the form of a diaphragm 1 closed by a membrane 3, for example a smoothed PTFE fabric, so that the housing bore 5 and the diaphragm 1 delimit an inside space 7 that can be vented to the outside 6 via the membrane 3. In fluid technology terms the inside space 7 is connected to the outside space 6 by a diaphragm bore 2 of the diaphragm 1 which is covered by the membrane 3. The housing bore 5 can be filled with oil from the hydraulic or electro-hydraulic control unit.

At least when the hydraulic or electro-hydraulic control unit is in operation, there is always in the housing bore 5 an oil column 8 which is kept at a pressure p applied by the hydraulic or electro-hydraulic control unit. This oil column 8 delimits the inside space 7 on its side opposite the diaphragm.

In order for any leakage (undesired in principle) to get through to the outside space 6, the oil held in the housing bore 5 would have to pass through the membrane 3 covering the diaphragm bore 2. Thus, during operation the oil pressure p acting on the oil column 8 is preferably adjusted so that oil in the housing bore 5 does not pass through the membrane 3, or only does so in small amounts, although a section of the housing bore 5 under the membrane remains permanently filled with oil—i.e. there is always an oil column in the housing bore 5—so that no air can be drawn back into the control unit from the outside 6.

It is advantageous for the oil pressure p acting on the oil column 8 to be adjusted by the hydraulic or electro-hydraulic control unit independently of any other working pressures of the control unit, to ensure that the venting device functions reliably under any operating conditions of the control unit. The pressure p can be predefined by the hydraulic or electro-hydraulic control unit as a constant value so that during operation an at least approximately constant oil pressure actually acts upon the oil column 8. Alternatively, however, the pressure p acting on the oil column 8 can also be predefined as a variable value.

The pressure level p to be set by the hydraulic or electro-hydraulic control unit, which acts upon the oil column 8 under the inside space 7 to be vented, is a function of the pore size category of the membrane 3 and a function of the inside diameter d of the diaphragm bore 2. For example, if the membrane 3 is air- and oil-tight up to a pressure of 0.5 bar, then the pressure level p acting on the oil column can be set for example at a constant value of 0.6 bar, which in practice can lead to a minimal oil leakage rate through the diaphragm 1, for example of about six milliliters per hour. For a technical application, as a rule a slight leakage of up to two milliliters per minute is acceptable.

Furthermore, by means of additional design measures (known per se) in the hydraulic or electro-hydraulic control unit in the area of the oil feed to the housing bore 5, it can be ensured that an oil column 8 remains in the housing bore 5 even when the control unit is not operating so that at no time can air be drawn back in from the outside space 6 through the venting device into the hydraulic system of the control unit. As an example of such a design measure, a one-way valve fitted in the inlet line of the housing bore can be mentioned.

Figure 3:
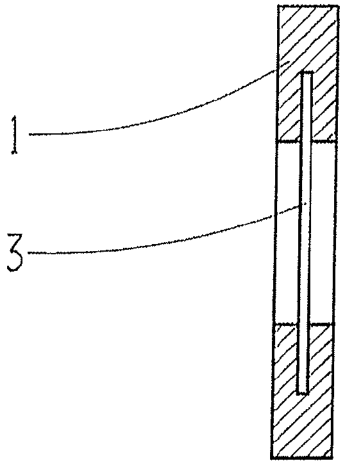
FIG. 3: An example design of the diaphragm of a venting device according to the invention.

FIG. 3 shows an enlarged, simplified sectional representation of an example embodiment of the diaphragm of a venting device according to the invention. The diaphragm 1 shown here is for example made as a plastic ring that encloses the membrane 3. The particular advantage of such a design is that it can be made inexpensively by injection molding. An alternative design of a venting device according to the invention that can also be produced inexpensively is a diaphragm in the form of a stamped sheet component in which the membrane is positioned and then fixed firmly by beading over the edges.

Of course, a person with experience of the field will design the outer contour of the diaphragm so as reliably to prevent fitting the diaphragm the wrong way round in the bore or recess that corresponds to its external shape, thus ensuring that the smooth side of a smoothed PTFE membrane always faces toward the oil column.

An example of the use of this venting device is the fitting of the diaphragm with the membrane embedded in it into a valve bore of a hydraulic or electro-hydraulic transmission control unit, which is thereby sealed off from the inside space of the transmission housing in a largely oil-tight but air-permeable manner. The added cost for effecting the necessary venting of the valve bore is decidedly small. In principle, however, the venting device according to the invention is suitable for all hydraulic or electro-hydraulic control units, particularly when very little fitting space is available for the venting device needed. Thus, the venting device according to the invention can be made with an inside diameter of the diaphragm of, for example, 0.25 to 3.00 mm, without problems.

INDEXES

1 Diaphragm
2 Diaphragm bore
3 Membrane, PTFE fabric
4 Housing, control unit housing
5 Housing bore
6 Outside space
7 Inside space
8 Oil column
A Venting curve
d Inside diameter of the diaphragm bore
p Pressure
Q Volume flow

The invention claimed is:

1. A venting device for either a hydraulic or an electro-hydraulic control unit, the venting device comprising a diaphragm (1) which is inset in a housing bore (5) of a housing (4) of the control unit, via a diaphragm bore (2) so that air, which collects in an interior of the housing of the control unit, can escape to an outer space (6) located outside the housing (4), the diaphragm bore (2) being closed by a membrane (3), which is permeable to both air and to oil when pressurized, so that the housing bore (5) and the diaphragm (1) delimit an inside space (7) that can be vented from the interior of the housing to the outside space (6) by way of the membrane (3), the inside space (7) being continually delimited during operation, on its side opposite the diaphragm (1), by an oil column (8), and the oil column (8) passes from the control unit into the housing bore (5) and is maintained therein at a defined pressure (p) applied by the control unit, the pressure maintained on the oil column by the control unit being such that oil present in the housing bore (5) either does not pass through the membrane (3) or only a minute amount of oil passes through the membrane (3), and the oil column (8) remaining permanently in the housing bore (5) being maintained at the pressure so that, at least to a large extent, only air contained in the oil column (8) is vented to the outside space (6) without any outside air being drawn back into the control unit.

2. The venting device according to claim 1, wherein the defined pressure (p), acting on the oil column (8), is set by the control unit independently of other working pressures of the control unit.

3. The venting device according to claim 1, wherein the defined pressure (p), acting on the oil column (8), is predefined as a function of a pore size category of the membrane (3) and as a function of an inside diameter (d) of the diaphragm bore (2).

4. The venting device according to claim 3, wherein an approximately constant pressure (p) permanently acts on the oil column (8) during operation of the venting device.

5. The venting device according to claim 4, wherein the defined pressure (p) is approximately 0.6 bar.

6. The venting device according to claim 3, wherein a variable pressure (p) permanently acts on the oil column (8) during operation of the venting device.

7. The venting device according to claim 1, wherein an oil leakage flow rate of at most 2 ml/min emerges, by way of the diaphragm (3), into the outer space (6) during operation of the venting device.

8. The venting device according to claim 7, wherein the oil leakage flow rate is at most 0.6 ml/h.

9. The venting device according to claim 1, wherein the diaphragm bore (2) of the diaphragm (1) has an inside diameter in a range of 0.25 mm to 3 mm.

10. The venting device according to claim 1, wherein the membrane (3) comprises a PTFE fabric which has a smoothed side, and the smoothed side of the membrane (3), following installation in the venting device, faces toward the oil column (8).

11. The venting device according to claim 1, wherein the membrane (3) is a fabric with an air permeability of approximately 7 $l/m^2/sec$.

12. The venting device according to claim 1, wherein the membrane (3) is a fabric with a pore size of about 12 μm.

13. The venting device according to claim 1, wherein design measures are provided in the hydraulic or the electro-hydraulic control unit, in an area of the oil feed to the housing bore, to prevent the oil column from draining out of the housing bore when the control unit is not operating so that air, from the outside space, is not drawn into the hydraulic system of the control unit by way of the venting device.

14. The venting device according to claim 1, wherein the control unit is a transmission control unit.

15. The venting device according to claim 14, wherein the housing bore (5) is a valve bore in the transmission control unit which is vented to an inside space of a transmission housing.

16. A venting device of either a hydraulic or an electro-hydraulic control unit, the venting device comprising a diaphragm (1) which is inset in a housing bore (5) of a housing (4) of the control unit, the diaphragm has a diaphragm bore (2) through which aft, which collects in an interior of the housing of the control unit, can escape to an outer space (6) outside the housing (4), the diaphragm bore (2) being closed by a membrane (3) which is permeable to both air and oil when under pressure, the housing bore (5) and the diaphragm (1) and a surface of a column of oil within the housing bore delimiting an inside space (7) in which air in the interior of the housing of the control unit collects, and the collected air is vented to the outside space (6) through the membrane (3), the inside space (7) and the oil column (8) being continually maintained at a defined pressure (p) by the control unit, the defined pressure being such that essentially no oil, present in the housing bore (5), passes from the interior of the housing through the membrane (3) to the outer space outside the housing, and the oil column (8) remaining permanently in the housing bore (5) such that essentially only the air, which collects in the inside space, is vented from the interior of the housing to the outside space (6) and air from the outside space is not drawn back into the control unit.

17. A venting device of a hydraulic control unit having a housing with a bore therein, the bore of the housing receives a diaphragm that has a hole, the hole in the diaphragm has a diameter in a range between approximately 0.25 mm and 3.00 mm and is enclosed by a membrane which separates an exterior of the housing from an interior of the housing, the membrane comprises a PTFE fabric having a pore size of approximately 12 μm and an air permeability of approximately 7 $l/m^2/sec$ and having a smoothed surface which faces the interior of the housing, a column of oil is maintained in the interior of the housing by the hydraulic control unit at a pressure exceeding a pressure threshold of approximately 0.5 bar such that air collected in the interior of the housing between the column of oil and the membrane passes through the membrane to the exterior of the housing, a height of the column of oil decreases when the pressure on the column of oil falls below the pressure threshold to prevent air from passing from the exterior of the housing to the interior of the housing.

* * * * *